(12) United States Patent
Landrieve et al.

(10) Patent No.: US 12,345,599 B2
(45) Date of Patent: Jul. 1, 2025

(54) SYSTEM FOR DETERMINING THE WEAR OF A BEARING AND ASSOCIATED METHOD

(71) Applicants: AKTIEBOLAGET SKF, Gothenburg (SE); SKF Australia Pty Ltd, Oakleigh (AU)

(72) Inventors: Franck Landrieve, Fondettes (FR); Lionel Martin, Kensington (AU); Ghufran Jan, Oakleigh (AU); Farrukh Yaqub, Pakenham (AU)

(73) Assignees: AKTIEBOLAGET SKF, Gothenburg (SE); SKF Australia Pty Ltd, Oakleigh (AU)

( * ) Notice: Subject to any disclaimer, the term of this patent is extended or adjusted under 35 U.S.C. 154(b) by 103 days.

(21) Appl. No.: 18/323,932

(22) Filed: May 25, 2023

(65) Prior Publication Data

US 2023/0408373 A1      Dec. 21, 2023

(30) Foreign Application Priority Data

Jun. 21, 2022   (DE) .......................... 102022206188.8

(51) Int. Cl.
| | | |
|---|---|---|
| G08B 21/10 | (2006.01) | |
| F16C 19/36 | (2006.01) | |
| F16C 19/52 | (2006.01) | |
| G01M 13/04 | (2019.01) | |

(52) U.S. Cl.
CPC ........... *G01M 13/04* (2013.01); *F16C 19/362* (2013.01); *F16C 19/522* (2013.01); *F16C 2233/00* (2013.01)

(58) Field of Classification Search
USPC ......... 340/425.5, 427, 679, 680, 682, 568.2, 340/576, 454, 488, 443, 441, 426.15, 340/426.16, 435
See application file for complete search history.

(56) References Cited

U.S. PATENT DOCUMENTS

| | | | | |
|---|---|---|---|---|
| 5,609,456 | A * | 3/1997 | Joki ........................ | F16C 19/54 |
| | | | | 411/291 |
| 5,697,472 | A * | 12/1997 | Walker .................... | B60T 17/22 |
| | | | | 192/30 W |
| 11,111,954 | B2 | 9/2021 | Landrieve | |
| 2008/0181762 | A1* | 7/2008 | Ganelin ................ | F04D 29/046 |
| | | | | 415/168.2 |
| 2013/0282117 | A1* | 10/2013 | Van Heugten ............ | A61F 2/14 |
| | | | | 623/6.22 |
| 2021/0123479 | A1 | 4/2021 | Landrieve | |
| 2021/0148408 | A1 | 5/2021 | Landrieve | |
| 2021/0148409 | A1 | 5/2021 | Capoldi | |
| 2021/0156421 | A1 | 5/2021 | Landrieve | |
| 2021/0156431 | A1 | 5/2021 | Landrieve | |
| 2021/0389213 | A1* | 12/2021 | Karl ...................... | B60W 50/14 |

\* cited by examiner

*Primary Examiner* — Daniel Previl
(74) *Attorney, Agent, or Firm* — J-TEK LAW PLLC; Scott T. Wakeman; Mark A. Ussai

(57) ABSTRACT

A bearing includes a first ring and a second ring capable of rotating concentrically relative to one another and a system for determining wear of the bearing in a machine. The system for determining wear includes identifying means for identifying a set of parameters of the machine acting on the load applied on the bearing, measuring means, conditioning means, determining means, first determining means, second determining means, and third determining means for determining the state of wear of the bearing according to the value of the representative parameter.

9 Claims, 7 Drawing Sheets

SYSTEM FOR DETERMINING THE WEAR OF A BEARING AND ASSOCIATED METHOD

CROSS-REFERENCE

This application claims priority to German patent application no. 102022206188.8 filed on Jun. 21, 2022, the contents of which are fully incorporated herein by reference.

BACKGROUND OF THE INVENTION

The present invention is directed bearings, and more particularly to a method and system for determining the wear of a slewing bearing in a machine.

More particularly, the invention deals with determining the wear of a bearing using distance sensors.

A machine, for example an excavator, comprises a slewing bearing comprising a first and a second ring rotating concentrically relative to one another, and rows of rolling elements interposed between the rings.

The first ring is fixed on the undercarriage of the excavator and the second ring is fixed on the upper carriage.

The upper carriage comprises a boom connected to the shovel.

During operations of the excavator, material is loaded in the shovel, the upper carriage rotates relative to the undercarriage and then the shovel is unloaded.

During operations, the slewing bearing is subjected to loads generated by the transfer of material.

The applied loads wear the raceways provided on the rings for the rolling elements.

When the degree of wear of the slewing bearing is too important, the slewing bearing is changed.

To quantify the degree of wear, a testing procedure is defined during which a differential distance (drop height) is measured between the first and second rings under calibrated conditions, for example specified load in the shovel, position of the boom to compare with recorded differential distances.

The differential distance is measured at regular time intervals starting from the first use of the slewing bearing.

If the subtraction of the differential distance measurement of the first use of the slewing bearing from the last differential distance measurement is greater than a wear threshold value, the slewing bearing is considered as worn out.

To measure the differential distance, the excavator is configured to observe calibrated conditions.

The calibrated conditions may comprise an angular boom position compared to the upper carriage and a determined load in the shovel so that the calibrated conditions may be easily reproduced.

During the testing procedure, the excavator is not operating normally losing productivity.

As the testing procedure is not implemented when the excavator is operating, the wear of the bearing is not continuously controlled.

The testing procedure is for example implemented every 12 months so that the wear of the slewing bearing is detected too late resulting in faults of the excavator.

The testing procedure may be implemented more frequently when approaching limit values of the differential distance to delay as long as possible the replacement of the slewing bearing.

However, generally due to the loose of productivity of the excavator during the testing procedure, the testing procedure is not enough repeated to accurately monitor the wearing state of the slewing bearing in order to precisely schedule its replacement.

The differential distance is measured by a sensor fixed on the upper or under carriage.

The upper and under carriages are deformed under the effect of the load so that the position of the sensor is not fix.

The differential distance measurements are distorted by the position variations of the sensor such that the measurements are not accurate.

SUMMARY OF THE INVENTION

In one aspect, the present invention is a method for determining the wear of a bearing in a machine, the bearing comprising a first ring and a second ring capable of rotating concentrically relative to one another. The method comprises the following steps:

a) identifying a set of parameters of the machine acting on the value of the load applied on the bearing, b) measuring a plurality of axial differential distances between the first ring and the second ring of the bearing, for each measured axial differential distance measuring a slew angle between the first and the second ring and the set of parameters associated with the axial differential distance, when the machine is operating during a predefined duration following the implementation of the bearing in the machine, c) determining a relationship between the measured axial differential distances, the measured slew angles and the measured sets of parameters, d) measuring the axial differential distance between the first ring and the second ring of the bearing and measuring the slew angle and the set of parameters associated with the axial differential distance during normal operation of the machine, e) determining an axial distance from the relationship determined at step c), and the slew angle and the set of parameters measured at step d), f) determining a representative parameter of the wear of the bearing by subtracting the axial distance determined at step e) from the axial differential distance measured at step d), and g) determining the state of wear of the bearing according to the value of the representative parameter.

The method permits controlling the wear of the bearing permanently when the machine is on duty without losing productivity.

The machine does not need to be configured to observe calibrated conditions.

Preferably, the step g) of determining the state of wear of the bearing comprises comparing the representative parameter to a threshold, the bearing being considered as being worn if the representative parameter is equal or greater than the threshold.

Advantageously, if the bearing is considered as being worn, the method comprises generating an alarm signal.

Preferably, the steps d) to g) are reiterated as long as the machine is operating during normal operation.

According to another aspect, the present invention is a bearing including a first ring and a second ring capable of rotating concentrically relative to one another and a system for determining the wear of the bearing in a machine. The system for determining the wear of the bearing comprises:

identifying means for identifying a set of parameters of the machine acting on the value of the load applied on the bearing, measuring means for measuring a plurality of axial differential distances between the first ring and the second ring of the bearing, and for each measured axial differential distance, measuring a slew angle between the first ring and the second ring during a predefined duration following the implementation of the bearing in the machine and during normal operation of the machine, conditioning means for associating a set of parameters and the slew angle to each measured axial differential distance determining means for determining a relationship between the measured axial differential distances, the measured slew angles and the measured sets of parameters, first determining means for determining an axial distance from the relationship determined by the determining means, slew angle and the set of parameters during normal operation of the machine, second determining means for determining a representative parameter of the wear of the bearing by subtracting the axial distance determined by the first determining means from the axial differential distance measured by the measuring means during normal operation of the machine, and third determining means for determining the state of wear of the bearing according to the value of the representative parameter.

Preferably, the measuring means include a first distance sensor and a second distance sensor each mounted on the first ring of the bearing.

Advantageously, at least a first tapered groove and at least a second tapered groove are formed on the second ring of the bearing and are oriented towards the first ring, the first distance sensor being mounted on the first ring and facing a tapered wall of the first tapered groove of the second ring which is inclined with respect to an axis of the bearing, a longitudinal axis of the first distance sensor being perpendicular to the tapered wall of the first tapered groove, and the second distance sensor being mounted on the first ring and facing a tapered wall of the second tapered groove of the second ring which is inclined with respect to the axis of the bearing, a longitudinal axis of the second distance sensor being perpendicular to the tapered wall of the second tapered groove, the tapered walls of the first and second grooves extending obliquely along two opposite directions.

Preferably, at least one tapered groove is formed on the outer cylindrical surface of the second ring and oriented towards the first ring.

the first distance sensor being mounted on the first ring and facing a tapered wall of the tapered groove of the second ring which is inclined with respect to an axis of the bearing, a longitudinal axis of the first distance sensor being perpendicular to the axis, and the second distance sensor being mounted on the first ring and distinct from the first distance sensor, the second distance sensor radially facing a second axial cylindrical surface of the second ring.

According to another aspect, the invention also relates to a machine comprising a bearing as defined above and sensors connected to the conditioning means.

BRIEF DESCRIPTION OF THE SEVERAL VIEWS OF THE DRAWINGS

Other advantages and features of the invention will appear on examination of the detailed description of embodiments, in no way restrictive, and the appended drawings in which.

DETAILED DESCRIPTION OF THE INVENTION

Figure 1:
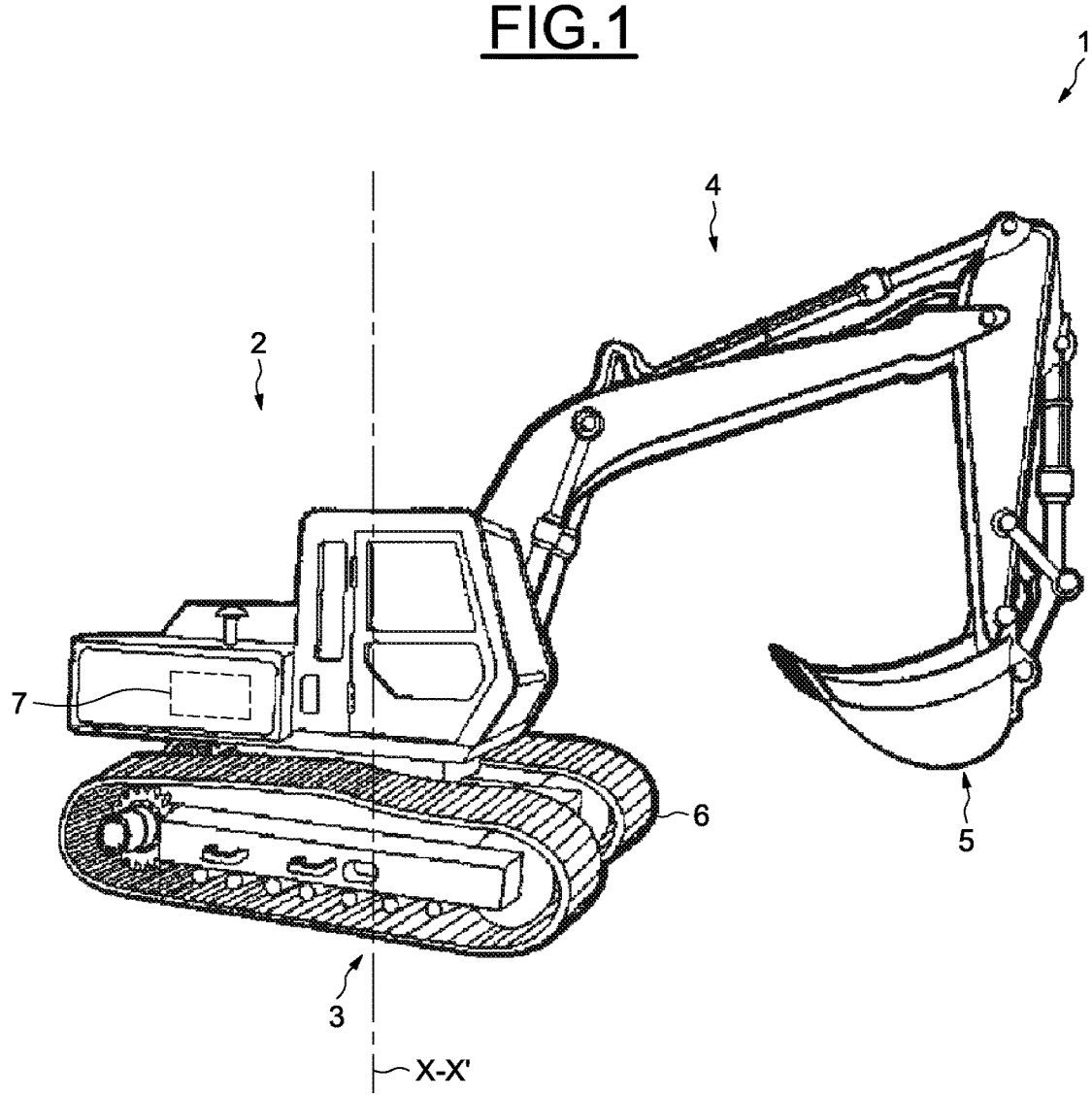
FIG. 1 illustrates schematically an excavator according to the invention.

Reference is made to FIG. 1 which represents an example of an excavator 1 comprising an upper carriage 2 and an undercarriage 3.

The upper carriage comprises a boom 4 connected to a shovel 5.

The excavator 1 further comprises a bearing 6 comprising a first ring and a second ring capable of rotating concentrically relative to one another (not represented), and a system 7 for determining the wear of the slewing bearing 6.

The bearing 6 connects the upper carriage 2 to the undercarriage 3 so that the upper carriage 2 rotates according to a bearing a rotation axis X-X' which runs in an axial direction compared to the under carriage 3.

The bearing 6 and the system 7 may be implemented in another machine for example a stacker reclaimer, the bearing connecting an under carriage to an upper carriage of the stacker reclaimer.

Figure 3:
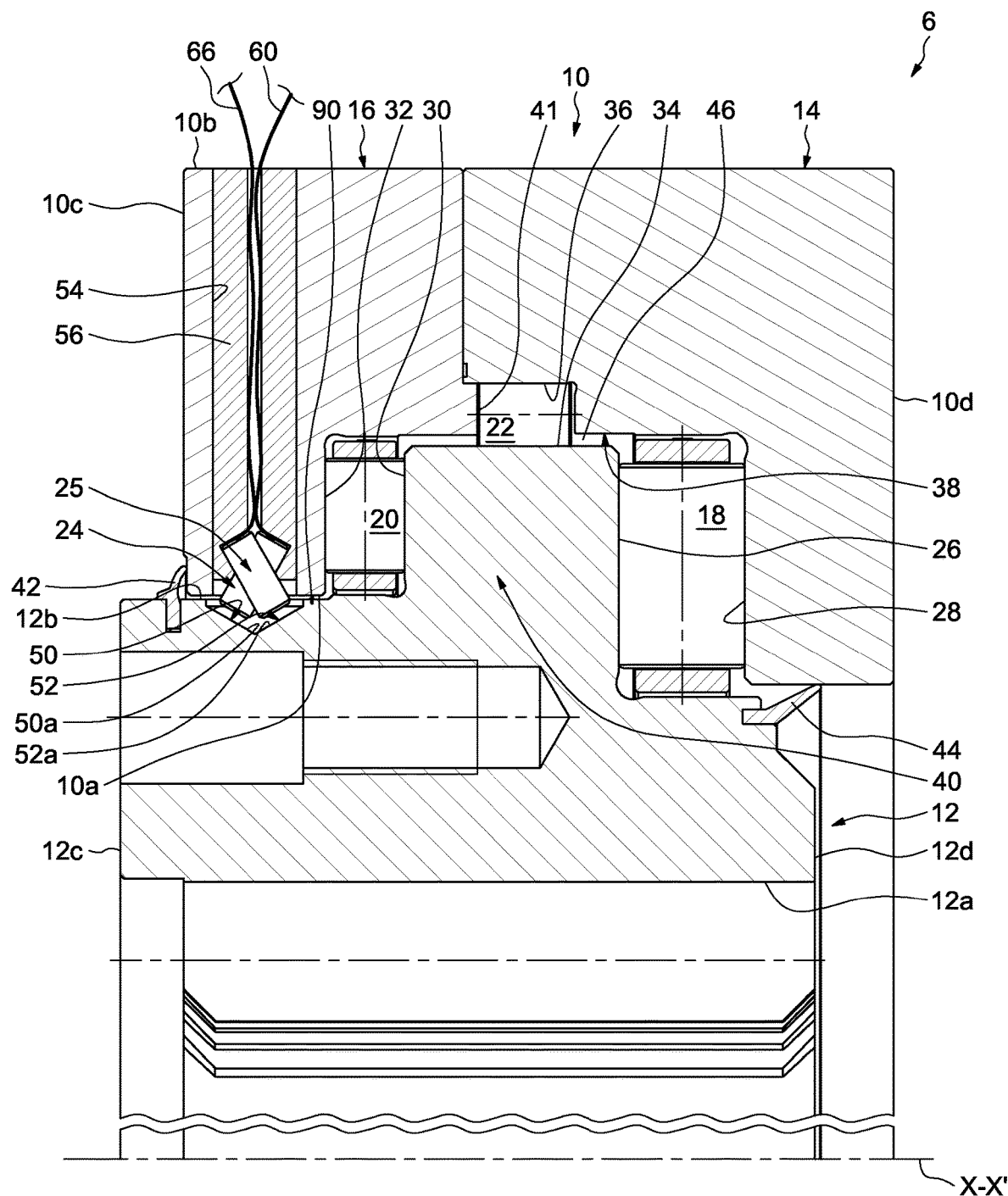
FIG. 3 is a partial cross-section of an example of a rolling bearing according to the invention.

The bearing 6 having the first and second rings 10, 12 is shown on FIG. 3.

Figure 2:
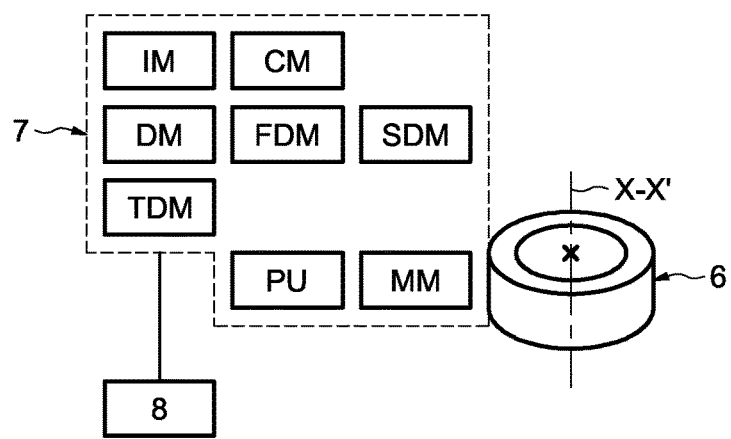
FIG. 2 illustrates schematically a system for determining the wear of the bearing according to the invention.

FIG. 2 illustrates an example of the system 7.

The system 7 is connected to a plurality of sensors 8 of the excavator 1 and to the bearing 6.

The sensors 8 measure parameters of the excavator 1, for example the load in the shovel 5, the position of the boom 4 compared to the upper carriage 2.

The system 7 comprises identifying means IM for identifying a set of parameters SET measured by the sensors 8 and acting on the load applied on the bearing 6. The set of parameters SET may comprise the load in the shovel, angular position of the boom compared to the upper carriage.

The system 7 further comprises measuring means MM for measuring a plurality of axial differential distances between the first ring and the second ring, and for each axial differential distance Da, measuring a slew angle $\alpha_a$ between the first and the second ring during a predefined duration following the implementation of the bearing in the excavator 1 and during normal operation of the excavator 1.

The slew angle $\alpha_a$ defines the position of one ring in relation to the other.

The first ring and the second ring may comprise each one reference point, the slew angle $\alpha_a$ defining the angle between a first line defined by the reference point of the first ring and a point on the rotation axis X-X', and between a second line defined by the reference point of the second ring and the point on the rotation axis X-X'.

The measuring means MM may comprise at least one distance sensor to measure the axial differential distance and at least one angular sensor to measure the slew angle.

The measuring means MM comprise for example first and second distance sensors 24, 25 (FIG. 3) and one angular sensor (not represented).

The system 7 further comprises conditioning means CM for associating a set of parameters SET measured by the sensors 8 and the slew angle to each measured axial differential distance Da.

The system 7 comprises determining means DM for determining a relationship REL between the measured axial differential distances Da, the measured slew angles $\alpha_a$ and the measured sets of parameters SET.

The system 7 comprises first determining means FDM for determining an axial distance Dd from the relationship REL determined by the determining means DM, the slew angle $\alpha_a$ and the set of parameters SET during normal operation of the excavator 1.

The system 7 further comprises second determining means SDM for determining a representative parameter VAL of the wear of the bearing 6 by subtracting the axial distance Dd determined by the first determining means FDM from the axial differential distance Da measured by the measuring means MM during normal operation of the machine.

The system 7 further comprises third determining means TDM for determining the state of wear of the bearing 6 according to the representative parameter VAL.

The system 7 further comprises a processing unit PU implementing the identifying means IM, the measuring means MM, the conditioning means CM, the determining means DM, the first determining means FDM, the second determining means SDM, and the third determining means TDM.

FIG. 3 illustrates a section of an example of the bearing 6.

The bearing 6 is a large-diameter rolling bearing comprising a first ring 10 and a second ring 12. In the illustrated example, the first ring 10 is the outer ring whereas the second ring 12 is the inner ring. The rolling bearing may for example be used in a tunnel boring machine, a wind turbine or any other applications using a large diameter rolling bearing.

The outer and inner rings 10, 12 are concentric and extend axially along the bearing rotation axis X-X' which runs in an axial direction. The rings 10, 12 are of the solid type.

The outer ring 10 is formed as a split ring and comprises a first ring 14 and a second ring 16 stacked one relative to the other in the axial direction. Each of the first and second rings 14, 16 of the outer ring is provided with a plurality of aligned through-holes (not shown) in order to be joined by fitting bolts.

In the illustrated example, the rolling bearing comprises two rows of axial rollers 18, 20 which are arranged between the outer and inner rings 10, 12 in order to form an axial thrust, and a row of radial rollers 22 which are arranged between the rings to form a radial thrust.

As will be described later, the rolling bearing also comprises the first and second distance sensors 24, 25 for detecting axial and radial relative displacements between the outer and inner rings 10, 12. In the illustrated example, the sensors 24, 25 are mounted on the outer ring 10.

The rollers 18, 20, 22 of one row are identical to one another. Each roller 18, 20, 22 comprises a cylindrical outer rolling surface and two opposite frontal end surfaces delimiting the outer rolling surface. The axis of rotation of each roller 22 is parallel to the axis X-X' of the bearing and perpendicular to the axes of each or the rollers 18, 20. In the illustrated example, the axial length of the rollers 18 is larger than the one of the rollers 20. Alternatively, the axial length of the rollers 18 may be smaller than, or may be equal to, the one of the rollers 20.

The rollers 18 are arranged axially between annular radial raceways 26, 28 respectively formed on the inner and outer rings 12, 10. Each radial raceway 26, 28 has in cross section a straight internal profile in contact with the rolling surfaces of the rollers 18. The raceways 26, 28 face each other in the axial direction.

The rollers 20 are arranged axially between annular radial raceways 30, 32 respectively formed on the inner and outer rings 12, 10. Each radial raceway 30, 32 has in cross section a straight internal profile in contact with the rolling surfaces of the rollers 20. The raceways 30, 32 axially face each other. The rows of rollers 18, 20 are spaced apart from each other in the axial direction.

The rollers 22 are arranged radially between annular axial raceways 34, 36 respectively formed on the inner and outer rings 12, 10. Each axial raceway 34, 36 has in cross section a straight internal profile in contact with the rolling surfaces of the rollers 22. The raceways 34, 36 face each other in the radial direction. The row of rollers 22 is radially offset outwards with respect to the rows of rollers 18, 20. The row of rollers 22 is axially located between the rows of rollers 18, 20.

The outer ring 10 comprises an annular groove 38 opening in a radial direction inwardly towards the inner ring 12. The outer ring 10 comprises an inner stepped cylindrical surface or bore 10a from which the groove 38 is formed. The outer ring 10 also comprises an outer cylindrical surface 10b which is radially opposite to the bore 10a. The outer ring 10 further comprises two opposite radial frontal surfaces 10c, 10d which axially delimit the bore 10a and the outer surface 10b of the ring.

The inner ring 12 comprises an annular protruding nose 40 engaging into the annular groove 38 of the outer ring. The nose 40 extends radially outwards.

The inner ring 12 comprises an inner cylindrical bore 12a and a stepped outer cylindrical surface 12b which is radially opposite to the bore 12a. In the illustrated example, the bore 12a of the inner ring is provided with a gear teeth (not referenced). The inner ring 12 further comprises two opposite radial frontal surfaces 12c, 12d which axially delimit the bore 12a and the outer cylindrical surface 12b. The protruding nose 40 protrudes radially from the outer cylindrical surface 12b.

The rows of rollers 18, 20 are arranged axially between the nose 40 of the inner ring and the groove 38 of the outer ring. The rows of rollers 18, 20 are disposed on each side of the nose 40 of the inner ring. The radial raceway 26 is located on the nose 40 and on a radial portion of the outer stepped cylindrical surface 12b of the inner ring. Alternatively, the radial raceway 26 may be completely located on the nose 40. The radial raceway 30 is located on the nose 40. The radial raceways 28, 32 are located on the groove 38 of the outer ring.

More precisely, a first radial flank of the nose 40 partly delimits the radial raceway 26 for the rollers 18. A first radial flank of the groove 38, which axially faces the first radial flank of the nose 40, delimits the radial raceway 28 for the rollers 18. A second flank of the nose 40 and a facing second flank of the groove 38 respectively delimits the radial raceways 30, 32 for the rollers 20. The opposite first and second flanks of the nose 40 delimit axially the nose.

Similarly, the opposite first and second flanks of the groove 38 delimit axially the groove. Each of the first and second flanks of the nose 40 extends radially the outer cylindrical surface 12b of the inner ring.

The row of rollers 22 is arranged radially between the nose 40 of the inner ring and the groove 38 of the outer ring. The axial raceways 34, 36 are respectively located on the nose 40 and the groove 38. An outer cylindrical surface of the nose 40 delimits the axial raceway 34. The outer cylindrical surface of the nose 40 and the outer cylindrical surface 12b are radially offset. As a result, the axial raceway 34 and the outer cylindrical surface 12b are also radially offset. The outer cylindrical surface of the nose 40 extends axially between the opposite radial flanks of the nose.

An axial bottom of the groove 38 delimits the axial raceway 36. In the illustrated example, an annular slot 41 is formed in the bottom of the groove 38 and delimits the axial raceway 36. The axial raceway 36 radially faces the outer cylindrical surface of the nose 40 onto which is formed the axial raceway 34.

In the illustrated example, the inner ring 12 is made in one part. Alternatively, the inner ring 12 may be divided in the axial direction in at least two separate parts secured together. In another variant, the nose 40 may be made separately from the main part of the inner ring.

As previously mentioned, the outer ring 10 is divided in the axial direction in two separate parts, the first ring 14 and the second ring 16. The first and second rings 14, 16 delimit together the groove 38. The radial raceway 28 is located on the first ring 14 and the radial raceway 32 is located on the second ring 16 of the outer ring.

The rolling bearing further comprises on each side an annular seal 42, 44 mounted on the inner ring 12 and provided to close the radial space that exists between the rings 10, 12. This radial space is defined between the bore 10a of the outer ring, and the outer cylindrical surface 12b and the outer surface of the nose 40 of the inner ring.

A closed space 46 is defined between the inner and outer ring 12, 14 and the seals 42, 44 in which the rows of rolling elements 18, 20 and 22, and the first and second distance sensors 24, 25 are housed.

Each seal 42, 44 is mounted into a groove (not referenced) formed on the outer cylindrical surface 12b of the inner ring and comes into contact with the outer ring 10. The seal 42 comes into contact with the radial frontal surface 10c of the outer ring. The seal 44 comes into contact with the bore 10a of the outer ring axially near the row of rollers 18. Alternatively, it could be possible to provide a reversed arrangement for at least one of the seals 42, 44 with the seal mounted on the outer ring 10 and coming into friction contact with the inner ring 12.

As previously mentioned, the first and second distance sensors 24, 25 are provided to detect axial and radial relative displacements between the outer and inner rings 10, 12. To this end, first and second annular tapered grooves 50, 52 are also formed on the inner ring 12. In the illustrated example, the grooves 50, 52 are formed on the outer cylindrical surface 12b of the inner ring.

Figure 4:
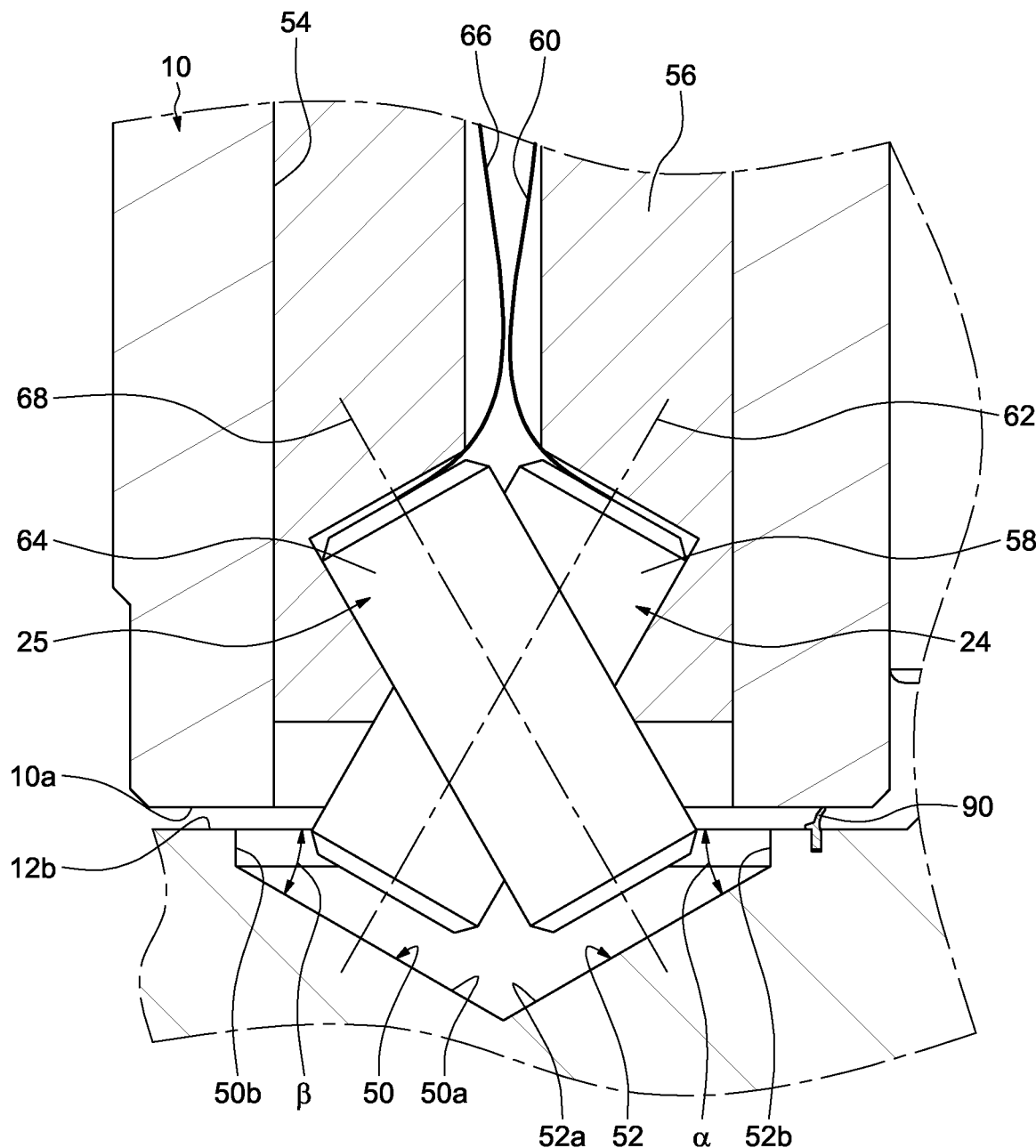
FIG. 4 is a detail view of FIG. 2.

As shown more clearly on FIG. 4, the first groove 50 extends radially inwards from the outer cylindrical surface 12b of the inner ring. The groove 50 comprises an annular tapered portion or wall 50a extending obliquely inwards. The tapered wall 50a has a frustoconical shape. The tapered wall 50a is inclined with respect to the axis X-X' (FIG. 3) of the rolling bearing. In other words, the tapered wall 50a is formed oblique to the axis X-X'. The tapered wall 50a is inclined with respect to the axial cylindrical surface 12b of the inner ring. In a radial plane of the rolling bearing as shown on FIG. 3, a first taper angle β is formed between the tapered wall 50a of the groove and the axial cylindrical surface 12b. For example, the value of the first taper angle β may be preferably comprised between 15° and 30°.

In the illustrated example, the groove 50 is provided with an annular radial side wall 50b extending radially inwards the outer cylindrical surface 12b and from which extends the tapered wall 50a. Alternatively, the groove 50 may be deprived of such side wall 50b. In this case, the tapered wall 50a extends directly from the axial cylindrical surface 12b of the inner ring.

The second groove 52 extends radially inwards from the outer cylindrical surface 12b of the inner ring. In the illustrated example, the second groove 52 extends axially from the first groove 50.

The groove 52 comprises an annular tapered portion or wall 52a extending obliquely inwards. The tapered wall 52a has a frustoconical shape. The tapered wall 52a is inclined with respect to the axis X-X' (FIG. 3) of the rolling bearing. The tapered wall 52a is inclined with respect to the axial cylindrical surface 12b of the inner ring. A second taper angle α is formed between the tapered wall 52a and the axial cylindrical surface 12b. In the illustrated example, the value of this second taper angle α is equal to the value of the first taper angle 3 formed between the tapered wall 50a of the first groove and the axial cylindrical surface 12b.

In the illustrated example, the second groove 52 is provided with an annular radial side wall 52b extending radially inwards the outer cylindrical surface 12b and from which extends the tapered wall 52a. Alternatively, the groove 52 may be deprived of such side wall 52b. In this case, the tapered wall 52a extends directly from the axial cylindrical surface 12b of the inner ring.

As previously mentioned, in the illustrated example, the second groove 52 extends axially from the first groove 50. Here, the tapered wall 52a of the second groove extends the tapered wall 50a of the second groove. Alternatively, a cylindrical bottom could interconnect the tapered walls 50a, 52a.

From the outer cylindrical surface 12b of the inner ring, the tapered wall 50a of the groove 50 extends obliquely inwards along a first direction and the tapered wall 52a of the groove 52 extends obliquely inwards along a second direction which is opposite to the first direction.

In the illustrated example, from the outer cylindrical surface 12b of the inner ring, the tapered wall 50a extends obliquely towards the frontal surface 12d (FIG. 3) of the inner ring while the tapered wall 52a extends obliquely towards the frontal surface 12c.

In the illustrated example, the tapered wall 52a of the groove 52 is symmetric to the tapered wall 50a of the groove 50 with respect to a radial plane passing through the edge between the walls. More generally, the groove 52 is symmetric to the groove 52 with respect to the radial plane.

The first distance sensor 24 faces the first groove 50. The sensor 24 faces the tapered wall 50a of the groove. The sensor 24 measures distances to the tapered wall 50a. The first distance sensor 25 faces the second groove 52. The sensor 25 faces the tapered wall 52a of the groove. The sensor 25 measures distances to the tapered wall 52a.

Referring once again to FIG. 3, the outer ring 14 is provided with a radial through-hole 54 inside which the first and second distance sensors 24, 25 are located. The through-hole 54 extends from the outer surface 10b of the outer ring and opens on the bore 10a. The through-hole 54 radially faces the first and second grooves 50, 52 of the inner ring.

In the illustrated example, each of the sensor 24, 25 is mounted into the through-hole 54 and protrudes radially into the radial space provided between the outer and inner rings 10, 12. The sensor 24 also protrudes into the first groove 50. The sensor 24 remains spaced apart from the tapered wall 50a of the groove. Similarly, the sensor 25 also protrudes into the second groove 52. The sensor 25 remains spaced apart from the tapered wall 52a of the groove. Alternatively, the sensors 24, 25 may be entirely located inside the through-hole 54.

The outer ring 10 further comprises a casing 56 which closes and seals the through-hole 54. The casing 56 also supports the sensors 24, 25. The sensors 24, 25 are secured to the casing 56 by any appropriate means. The casing 56 is located radially into the through-hole 54. The casing 56 is secured inside the through-hole 54 by any appropriate means, for example by force-fitting. The casing 56 is flush with the outer cylindrical surface 10b of the outer ring.

As shown more clearly on FIG. 4, the first sensor 24 comprises a sensor body 58 mounted inside the casing 56 of the outer ring. The sensor body 58 faces the tapered wall 50a of the first groove. The sensor body 58 protrudes into the groove 50. The sensor body 58 remains spaced apart from the tapered wall 50a.

In the disclosed example, the sensor 24 also comprises an output connecting cable 60 for transmitting sensing data which extends outwards relative to the sensor body 58. The output cable 60 extends radially outwards. The casing 56 is provided with a through-opening (not referenced) wherein the output cable 60 can go through. The output cable 60 connects the sensor 24 to the conditioning means CM so as to transmit sensed measurements. Alternatively, the sensor 24 may be deprived of such output cable in case of a wireless sensor.

The sensor body 58 of the first sensor has a longitudinal axis 62 extending obliquely. The axis 62 also forms the longitudinal axis of the sensor 24. The axis 66 is perpendicular to the tapered wall 50a of the first groove.

The second sensor 25 comprises a sensor body 64 mounted inside the casing 56. The sensor body 64 faces the tapered wall 52a of the second groove. The sensor body 64 protrudes into the groove 52. The sensor body 64 remains spaced apart from the tapered wall 52a.

In the disclosed example, the sensor 25 also comprises an output connecting cable 66 for transmitting sensing data which extends outwards relative to the sensor body 64. The output cable 66 goes through the opening of the casing 56. The output cable 66 connects the sensor 25 to the conditioning means CM so as to transmit sensed measurements. Alternatively, the sensor 25 may be deprived of such output cable in case of a wireless sensor.

The sensor body 64 of the second sensor has a longitudinal axis 68 extending obliquely. The axis 68 also forms the longitudinal axis of the sensor 25. The axis 68 is perpendicular to the tapered wall 52a of the second groove.

Each of the sensor 24, 25 may be an inductive distance sensor, or an ultrasonic distance sensor, or an optical distance sensor. Alternatively, each of the sensor 24, 25 may be a mechanical distance sensor provided with a contact stylus. In this last case, the mechanical sensor faces the tapered wall 50a or 52a of the groove but also comes into contact with the tapered wall.

As previously mentioned, the sensor 24 measures distances to the tapered wall 50a of the first groove of the inner ring. The distances are measured along the longitudinal axis 62 of the sensor 24. The sensor 25 measures distances to the tapered wall 52a of the second groove of the inner ring. The distances are measured along the longitudinal axis 68 of the sensor 25.

Figure 5:
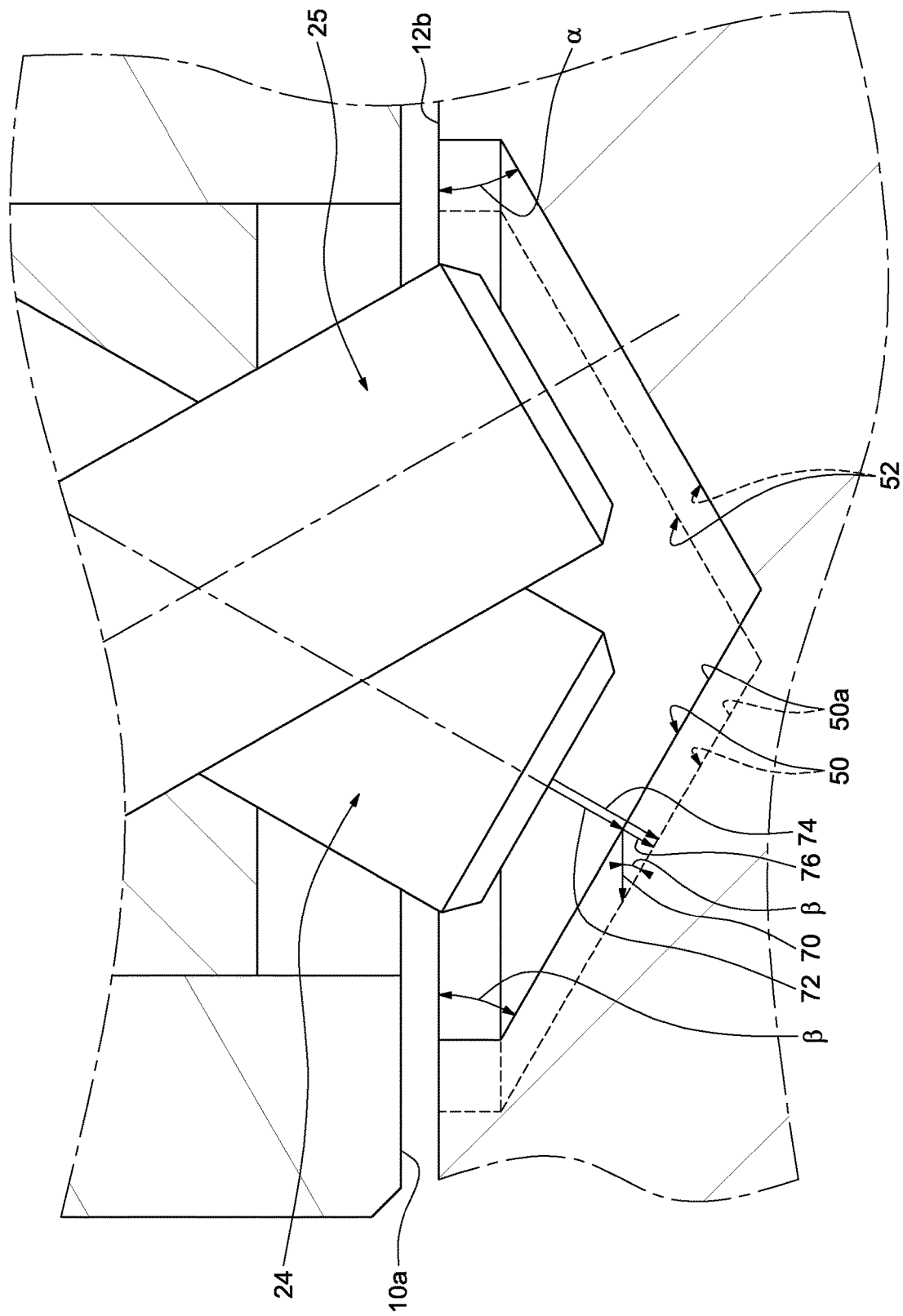
FIG. 5 is a detail view of FIG. 2 illustrating schematically an axial displacement of one ring of the bearing relative to another ring.

A pure axial displacement of the inner ring 12 relative to the outer ring 10 is shown schematically and partially on FIG. 5. The grooves 50, 52 represented in dotted lines illustrate the position of the inner ring 12 after the axial displacement. The axial displacement Da of the inner ring 12 relative to the outer ring 10 is illustrated by the arrow referenced 70.

The arrow referenced 72 illustrates a first distance to the tapered wall 50a of the groove measured by the sensor 24 before the axial displacement of the inner ring 12 relative to the outer ring 10. A second distance to the tapered wall 50a of the groove measured by the sensor 24 after this axial displacement is illustrated by the arrow referenced 74.

The displacement ΔM of the tapered wall 50a of the groove relative to the outer ring 10, which is detected by the sensor 24, is represented by the arrow referenced 76. The value of the relative displacement ΔM is equal to the differential measurement of the sensor 24, i.e. the difference between the second and the first distances measured by the sensor 24.

In case of pure axial displacement of the inner ring 12 relative to the outer ring 10 as shown on FIG. 5, the value of the displacement ΔM of the tapered wall 50a of the groove relative to the outer ring 10 is also equal to:

$$\Delta M = Da \times \sin \beta \quad (1)$$

where Da is the axial differential distance of the inner ring 12 relative to the outer ring 10, and β the value of the first tapered angle of the tapered wall 50a of the first groove.

Figure 6:
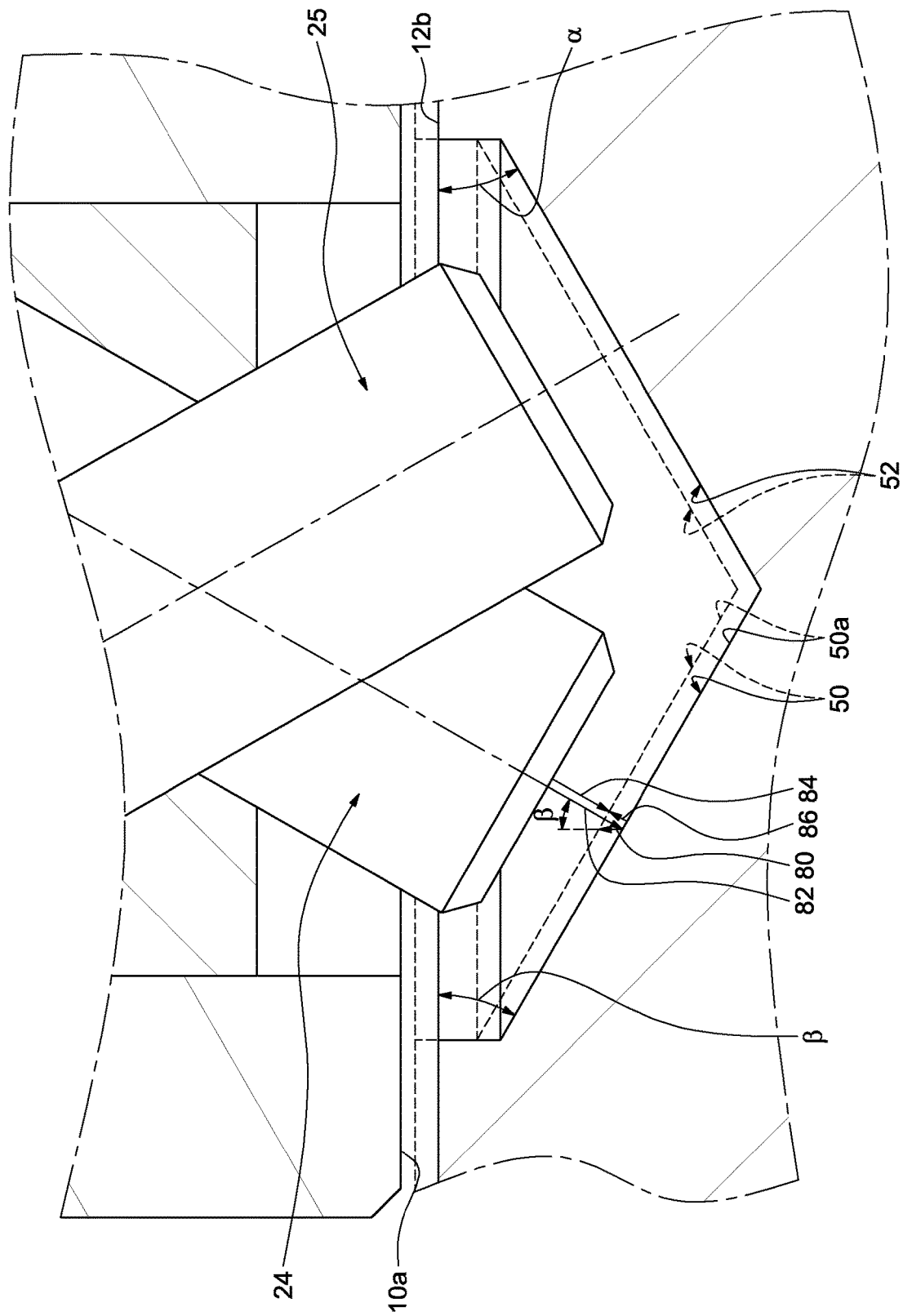
FIG. 6 is a detail view of FIG. 2 illustrating schematically a radial displacement of one ring of the bearing relative to another ring.

A pure radial displacement of the inner ring 12 relative to the outer ring 10 is shown schematically and partially on FIG. 6. The radial displacement Dr of the inner ring 12 relative to the outer ring 10 is illustrated by the arrow referenced 80.

The arrow referenced 82 illustrates a first distance to the tapered wall 50a of the groove measured by the sensor 24 before the radial displacement of the inner ring 12 relative to the outer ring 10. A second distance to the tapered wall 50a of the groove measured by the sensor 24 after this radial displacement is illustrated by the arrow referenced 84.

The displacement ΔM of the tapered wall 50a of the groove relative to the outer ring 10, which is detected by the sensor 24, is represented by the arrow referenced 86. The value of the relative displacement ΔM is equal to the differential measurement of the sensor 24.

In case of pure radial displacement of the inner ring 12 relative to the outer ring 10 as shown on FIG. 5, the value of the displacement ΔM of the tapered wall 50a of the groove relative to the outer ring 10 is also equal to:

$$\Delta M = Dr \times \cos \beta \quad (2)$$

where Dr is the value of the radial displacement of the inner ring 12 relative to the outer ring 10, and β the value of the first tapered angle of the wall 50a of the first groove.

In case of combined axial and radial displacements of the inner ring 12 relative to the outer ring 10 and considering that signals $S_{24}$ emitted by the first sensor 24 are a linear function of the distance measured by this sensor, the differential measurement $\Delta S_{24}$ of the sensor is thus defined by:

$$\Delta S_{24} = Dr \times \cos \beta + Da \times \sin \beta \quad (3)$$

Similarly, as concern the second sensor 25 facing the tapered wall 52a of the second groove, the differential measurement $\Delta S_{25}$ of this second sensor is defined by:

$$\Delta S_{25} = Dr \times \cos \alpha - Da \times \sin \alpha \quad (4)$$

where α is the value of the second tapered angle of the wall 50a of the groove.

As previously mentioned, in the illustrated example, the value of this second taper angle α is equal to the value of the first taper angle β formed between the tapered wall 50a of the first groove and the axial cylindrical surface 12b.

Accordingly, in this specific example, the differential measurement $\Delta S_{25}$ of the second sensor 25 is also defined by:

$$\Delta S_{25} = Dr \times \cos \beta - Da \times \sin \beta \quad (5)$$

Therefore, the axial relative displacement Da and the radial relative displacement Dr of the inner ring 12 relative to the outer ring 10 are equal to:

$$Da = \frac{(\Delta S_{24} - \Delta S_{25})}{2 \cdot \sin \beta} \quad (6)$$

$$Dr = \frac{(\Delta S_{24} + \Delta S_{25})}{2 \cdot \cos \beta} \quad (7)$$

Accordingly, the axial and radial relative displacements of the inner ring 12 relative to the outer ring 10 can be calculated from the displacements measured by the sensors 24, 25. Advantageously, the determining means DM calculates these axial displacements of the inner ring 12 relative to the outer ring 10.

Referring once again to FIGS. 3 and 4, in the illustrated example, the rolling bearing further comprises an additional seal 90 disposed inside the closed space 46 which is delimited by the seals 42, 44. The seal 90 is axially located near to the seal 42. The seal 90 is axially disposed between the seal 42 and the row of axial rollers 20. In the illustrated example, the seal 90 is mounted into a groove (not referenced) formed on the outer cylindrical surface 12b of the inner ring and comes into contact with the outer ring 10. The seal 90 comes into contact with the bore 10a of the outer ring near to the through-hole 54. Alternatively, the seal 90 may be mounted on the outer ring 14 and come into friction contact with the inner ring 12.

Radially between the outer and inner rings 10 and 12, the seal 90 delimits together with the seal 42 a closed detection space (not referenced) inside which open the first and second grooves 50, 52 of the inner ring and the through-hole 54 of the outer ring. Only the grooves 50, 52, the through-hole 54 and the sensors 24, 25 are located inside the detection space. There is no row of rollers inside the detection space. This reduces the risk that pollution, such as grease, dust, water, reaches the sensors 24, 25.

Figure 7:
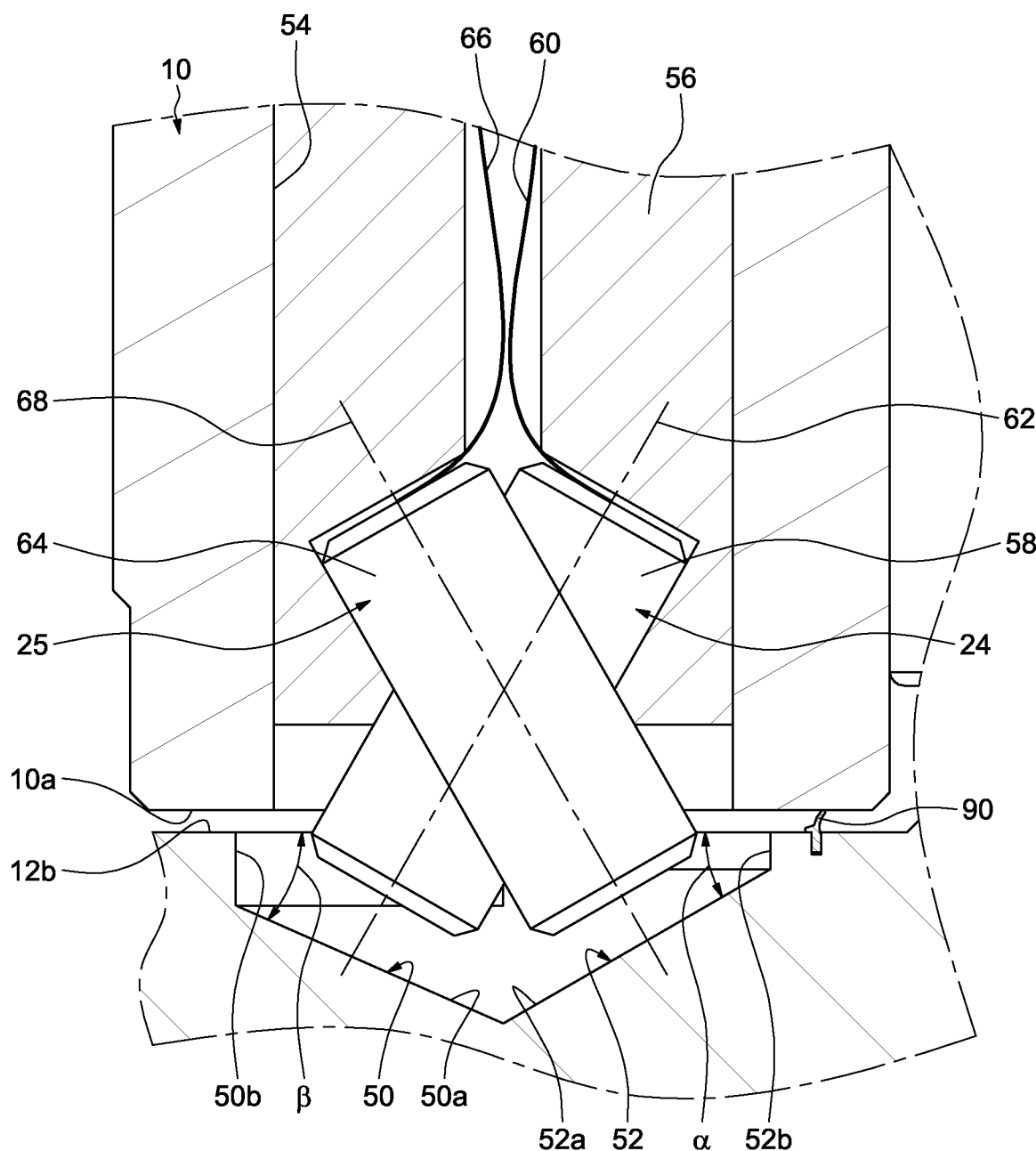
FIG. 7 is a detail view of a rolling bearing according to a second example of the invention.

The example shown on FIG. 7, in which identical parts are given identical references, only differs from the first example in that the value of the first taper angle 3, which is formed between the tapered wall 50a of the first groove and the axial cylindrical surface 12b, is different from the value of the second taper angle α formed between the tapered wall 52a of the second groove and the axial cylindrical surface 12b.

Accordingly, in this case, the axial relative displacement Da and the radial relative displacement Dr of the inner ring 12 relative to the outer ring 10 are equal to:

$$Da = \frac{(\Delta S_{24} - b \cdot \Delta S_{25})}{(\sin \beta + b \cdot \sin \alpha)} \quad (8)$$

$$Dr = \frac{(\Delta S_{24} + a \cdot \Delta S_{25})}{(\cos \beta + a \cdot \cos \alpha)} \quad (9)$$

where $$a = \frac{\sin \beta}{\sin \alpha} \text{ and} \quad (10)$$

$$b = \frac{\cos \beta}{\cos \alpha} \quad (11)$$

In the illustrated examples, the tapered grooves 50, 52 are formed on the outer cylindrical surface 12b of the inner ring axially between the row of axial rollers 20 and the seal 42. Alternatively, according to the design of the rolling bearing, it could be possible to provide the grooves 50, 52 on another zone of the outer cylindrical surface 12b, or on the outer cylindrical surface of the nose of the inner ring.

In the illustrated examples, the tapered grooves 50, 52 are connected together. In other words, the second groove 52 extends axially to the first groove 50. In another variant, the tapered grooves 50, 52 may be axially spaced relative to each other. The tapered grooves 50, 52 may be provided on the same outer cylindrical surface of the inner ring, or on two distinct axial cylindrical surfaces of the inner ring, for example the outer cylindrical surface 12b and the outer cylindrical surface of the nose of the inner ring.

Otherwise, as previously mentioned, in this illustrated example, the first ring of the rolling bearing is the outer ring 10 whereas the second ring is the inner ring 12.

As an alternative, it could be possible to provide a reversed arrangement with the first ring forming the inner ring and the second ring forming the outer ring. In this case, each of the tapered groove 50, 52 is formed on the axial inner cylindrical surface of the outer ring, which forms the bore of the outer ring, and the sensors 24, 25 are mounted on the inner ring.

In another embodiment (not represented), one single tapered groove is formed on the outer cylindrical surface 12b of the second ring and oriented towards the first ring 10.

The first distance sensor 24 is mounted on the first ring 10 and facing a tapered wall of the tapered groove of the second ring 12 which is inclined with respect to the axis X-X'.

The longitudinal axis 62 of the first distance sensor 24 is perpendicular to the axis X-X'.

The second distance sensor 25 is mounted on the first ring 10 and distinct from the first distance sensor 24.

The second distance sensor 25 radially faces a second axial cylindrical surface of the second ring 12.

The axial relative displacement Da and the radial relative displacement Dr of the inner ring 12 relative to the outer ring 10 are equal to:

$$Da = \frac{(\Delta M + Dr)}{(\sin \gamma)} \quad (12)$$

where ΔM is the value of the differential measurement of the first distance sensor 24 on the tapered wall of the second ring 12, and the radial relative displacement Dr is the value of the differential measurement of the second distance sensor 25 on the outer cylindrical surface 12b of the second ring 12, and γ is the value of the angle formed between the tapered wall of the tapered groove and the outer cylindrical surface 12b of the second ring 12 in a radial plane of the bearing 8.

Figure 8:
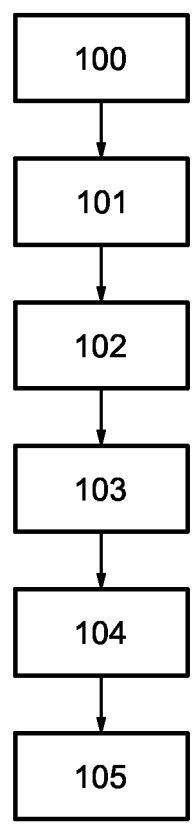
FIG. 8 illustrates an example of a method for determining the wear of the bearing according to the invention.

FIG. 8 illustrates an example of a method implementing the system 1.

In step 100, the identifying means ID identify set of parameters of the excavator 1 acting on the value of the load applied on the bearing 6.

The axial distance Da measured by the measuring means MM is indicative of the load applied on the bearing 6.

The axial distance Da is dependent on the load applied on the bearing 6.

The greater the load applied on the bearing 6 is, the shorter the measured axial distance Da.

The set of parameters is determined by the identifying means ID implementing for example known screening methods.

During step 101, when the excavator is operating during a predefined duration following the implementation of the bearing 6 in the excavator, the measuring means MM measure a plurality of axial differential distances Da between the first ring 10 and the second ring 12 of the bearing 6.

For each measured axial differential distance, the measuring means MM further measure the slew angle $\alpha_a$ between the first 10 and the second 12 ring.

The conditioning means CM associate a set of parameter values SET and a slew angle value to each measured axial differential distance Da.

The predefined duration is chosen so that the set of parameter values SET scan the entire possible range of variation of the parameter values to cover all or substantially all the possible conditions of use of the excavator before noticing wearing of the bearing 6.

The predefined duration is for example equal to two weeks until two months according to the use of the excavator.

During step 102, the determining means DM determine the relationship REL such as:

$$REL = F(\alpha_a, SET) \quad (13)$$

where F is a relationship F determined using known linear regression methods on the measured set of parameters, slew angle and axial distance Da.

During step 103, during normal operation of the excavator, after the predetermined duration, the measuring means MM measure the axial differential distance Da and the slew angle $\alpha_a$.

The sensors 8 measure the set of parameters SET.

The conditioning means CM associate a set of parameter values SET and a slew angle value to each measured axial differential distance Da.

During step 104, the first determining means FDM determine the axial distance Dd from the relationship REL determined by the determining means DM, the slew angle value and the set of parameters values measured during normal operation of the excavator 1.

During step 105, the second determining means SDM determine the representative parameter VAL of the wear of the bearing 6 by subtracting the axial distance Dd determined by the first determining means FDM from the axial differential distance Da measured by the measuring means MM during normal operation of the excavator:

$$AL = Da - Dd \quad (14)$$

The axial distance Dd is the axial distance between the first 10 and second 12 rings when the bearing 6 is not wear under the same set of parameters values and slew value as the measure axial distance Da by the measuring means MM.

During step 106, the third determining means TDM determine the state of wear of the bearing 6 according to the value of the representative parameter VAL.

The third determining means TDM compare the value of the representative parameter VAL to a threshold TH.

The bearing 6 is consider worn if the representative parameter VAL is equal or greater than the threshold TH.

The threshold TH is determined for example empirically on a test bench.

If the bearing 6 is considered as worn, the system 7 generates an alarm signal.

The steps 103 to 105 are reiterated as long as the excavator 1 is operating during normal operation.

The system 7 permits to control the wear of the bearing 6 permanently when the excavator 1 is on duty without losing productivity.

The sensors 8 used to measure the parameters are implemented in the excavator 1 for other applications so that no new sensors need to be implemented in the excavator 1.

The measuring means MM comprising the first and second distance sensors 24, 25 mounted on the outer ring 10 deliver more accurate measurements as the first and second distance sensors 24, 25 do not measure the deformation of the upper and under carriages deformed under the effect of the load in the shovel 5.

In another embodiment, the measuring means MM may comprise a distance sensor located outside the bearing 6.

In the described examples, the bearing 6 is a bearing provided with three rows of rolling elements. Alternatively, the rolling bearing may comprise only one row of rolling elements, or two rows of rolling elements, or four or more rows of rolling elements. In the illustrated example, the rolling elements are rollers. The rolling bearing may comprise other types of rolling elements, for example balls. In another variant, the bearing may also be a sliding bearing having no rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A method for determining wear of a bearing in a machine, the bearing including a first ring and a second ring capable of rotating concentrically relative to one another, the method comprising the steps of:
   a) identifying a set of parameters of the machine acting on a value of a load applied on the bearing;
   b) measuring a plurality of axial differential distances between the first ring and the second ring of the bearing, for each measured axial differential distance measuring a slew angle between the first and the second rings and the set of parameters associated with the axial differential distance, when the machine is operating during a predefined duration following an implementation of the bearing in the machine;
   c) determining a relationship between the measured axial differential distances, the measured slew angles and the measured sets of parameters;
   d) measuring the axial differential distance between the first ring and the second ring of the bearing, the slew angle and the set of parameters associated with the axial differential distance during normal operation of the machine;
   e) determining an axial distance from the relationship determined at step c), and the slew angle and the set of parameters measured at step d);
   f) determining a representative parameter of the wear of the bearing by subtracting the axial distance determined at step e) from the axial differential distance measured at step d); and
   g) determining a state of wear of the bearing according to the value of the representative parameter.

2. The method according to claim 1, wherein the step g) of determining the state of wear of the bearing includes comparing the representative parameter to a threshold, the bearing being considered as being worn if the representative parameter is equal to or greater than the threshold.

3. The method according to claim 2, wherein if the bearing is considered as being worn, the method further comprises the step of generating an alarm signal.

4. The method according to claim 1, wherein steps d) to g) are reiterated as long as the machine is operating during normal operation.

5. A bearing assembly for a machine, the bearing assembly comprising:
   a bearing including a first ring and a second ring capable of rotating concentrically relative to each other; and
   a system for determining wear of the bearing in the machine, the system comprising:
   identifying means for identifying a set of parameters of the machine acting on a value of a load applied on the bearing;
   measuring means for measuring a plurality of axial differential distances between the first ring and the second ring of the bearing, and for each measured axial differential distance, measuring a slew angle between the first ring and the second ring during a predefined duration following an implementation of the bearing in the machine and during normal operation of the machine;
   conditioning means for associating a set of parameters and the slew angle to each measured axial differential distance;
   determining means for determining a relationship between the measured axial differential distances, the measured slew angles and the measured sets of parameters;
   first determining means for determining an axial distance from the relationship determined by the determining means, slew angle and the set of parameters during normal operation of the machine;
   second determining means for determining a representative parameter of the wear of the bearing by subtracting the axial distance determined by the first determining means from the axial differential distance measured by the measuring means during normal operation of the machine; and
   third determining means for determining a state of wear of the bearing according to the value of the representative parameter.

6. The bearing according to claim 5, wherein the measuring means include a first distance sensor and a second distance sensor each mounted on the first ring of the bearing.

7. The bearing according to claim 6, wherein:
   at least a first tapered groove and at least a second tapered groove are formed on the second ring of the bearing and are oriented towards the first ring;
   the first distance sensor is mounted on the first ring and so as to face a tapered wall of the first tapered groove of the second ring, the tapered wall being inclined with respect to an axis of the bearing, a longitudinal axis of the first distance sensor being perpendicular to the tapered wall of the first tapered groove;
   the second distance sensor is mounted on the first ring so as to face a tapered wall of the second tapered groove of the second ring, the tapered wall of the second tapered groove being inclined with respect to the axis of the bearing, a longitudinal axis of the second distance sensor being perpendicular to the tapered wall of the second tapered groove; and
   the tapered wall of the first groove and the tapered wall of the second groove extending obliquely along two opposite directions.

8. The bearing according to claim 6, wherein:
   at least one tapered groove is formed on the outer cylindrical surface of the second ring and oriented towards the first ring;
   the first distance sensor being mounted on the first ring and facing a tapered wall of the tapered groove of the second ring, the tapered wall being inclined with respect to an axis of the bearing, a longitudinal axis of the first distance sensor being perpendicular to the axis; and
   the second distance sensor being mounted on the first ring and distinct from the first distance sensor, the second distance sensor radially facing a second axial cylindrical surface of the second ring.

9. A machine comprising a bearing according to claim 5 and sensors connected to the conditioning means.

* * * * *